Oct. 21, 1969  J. B. LAPPIN, JR  3,473,275
FLYING SPIRAL STAIRWAY
Filed Sept. 8, 1965  3 Sheets-Sheet 1
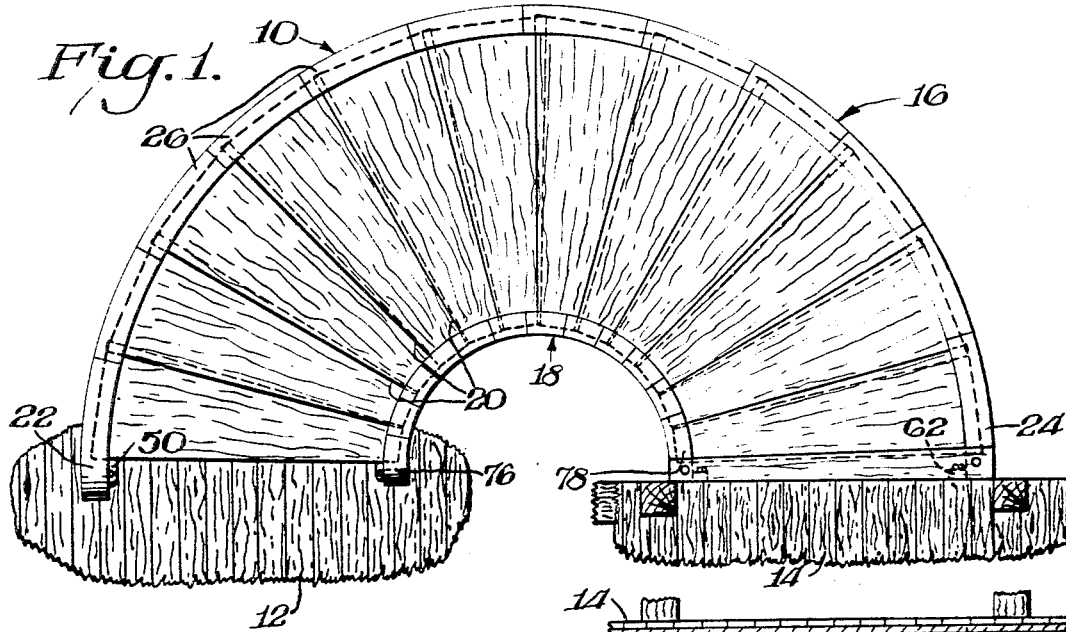
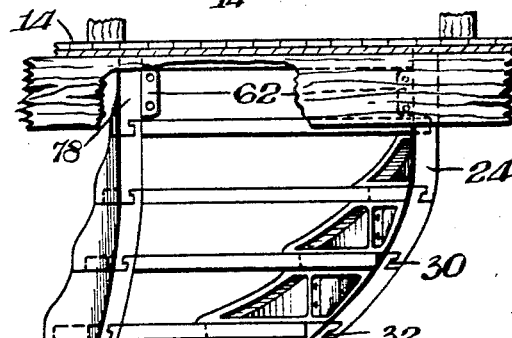
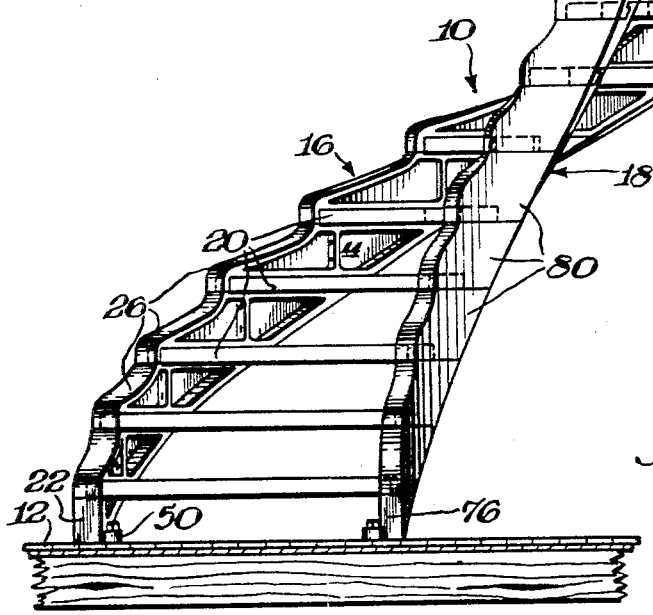
INVENTOR
James B. Lappin, Jr.
BY Connolly and Hutz
ATTORNEYS

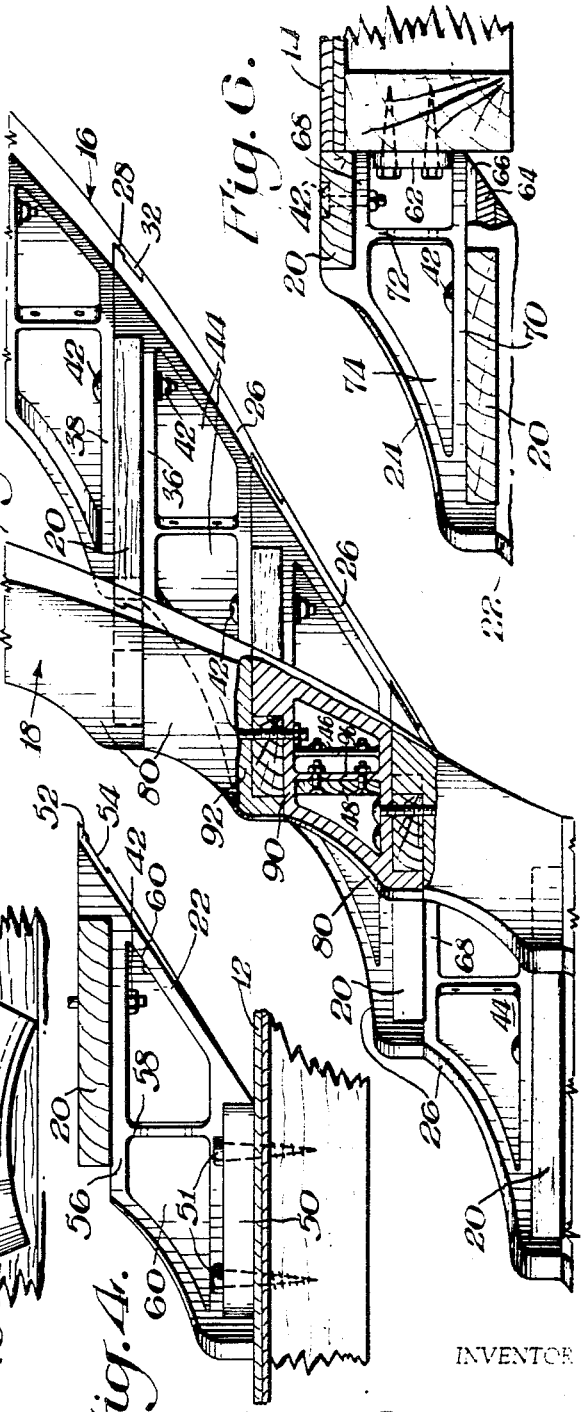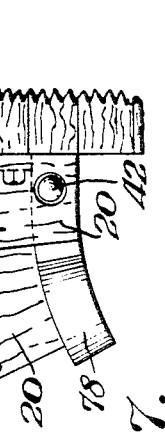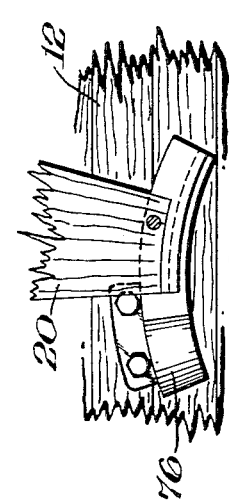

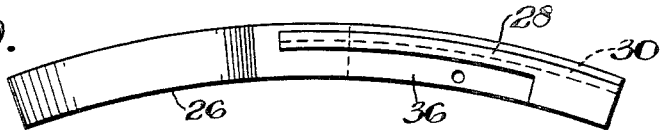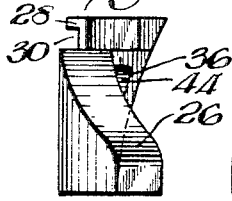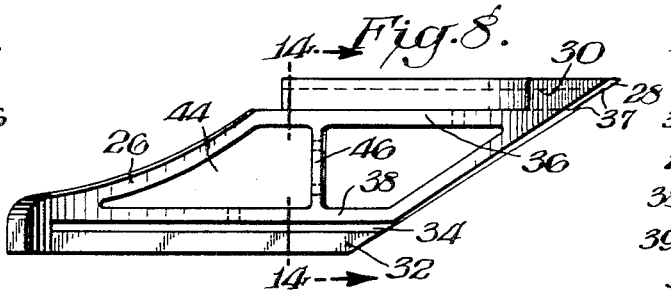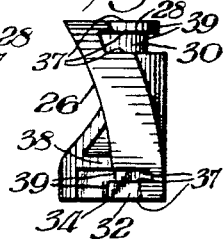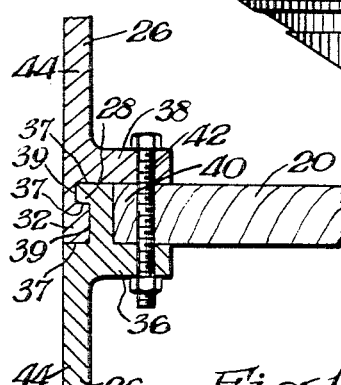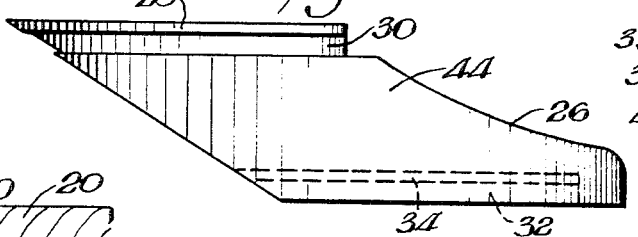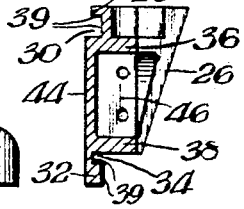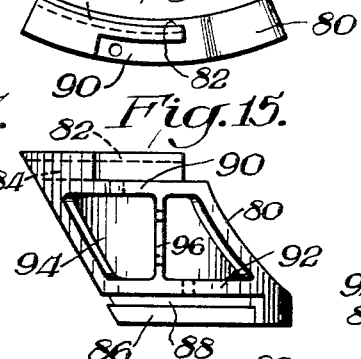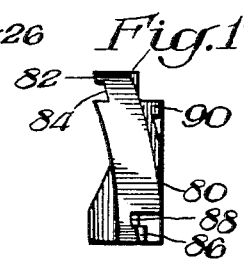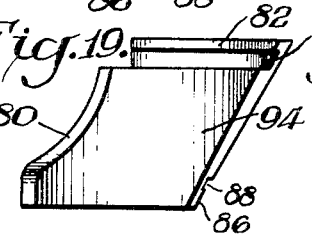

United States Patent Office 3,473,275
Patented Oct. 21, 1969

3,473,275
FLYING SPIRAL STAIRWAY
James B. Lappin, Jr., 32 Averill Terrace,
Waterville, Maine 04901
Filed Sept. 8, 1965, Ser. No. 485,772
Int. Cl. E04f 11/02
U.S. Cl. 52—187                    6 Claims

ABSTRACT OF THE DISCLOSURE

A flying spiral stairway comprising inner and outer curved tread supporting columns between which a plurality of stair treads are supported. Each column comprises an assembled series of individual tread supporting units with mating portions at the upper and lower ends of each unit for connecting adjacent units in the assembled series.

---

This invention relates to stairways, and more particularly to "flying spiral" stairways constructed without the benefit of continuous supporting stringers.

Stairways in general comprise a plurality of stair treads supported on continuous supporting stringers which in turn are secured at a convenient angle for pedestrian ascendency between two vertically spaced landings or support surfaces, usually floors or levels of a building, to thereby provide access between two landings or levels. Stairways of this nature have many advantages over planar surfaced ramps or steps arranged essentially vertically in the form of a ladder, yet stairways impose structural problems not found in ramps or ladders. The so-called flying stairways which are supported only at their extremities between landings which are spaced horizontally as well as vertically ordinarily depend on continuous supporting stringers as the basic structural member. As strictly functional members, however, it is next to impossible to incorporate artistic or decorative variety into previously known stringers without great expense. Especially where curved or spiral flying stairways are concerned, the expense of continuous supporting stringers has prevented such stairways from gaining widespread popularity.

Accordingly, it is an object of the present invention to provide a flying stairway which may be quickly and easily assembled without benefit of continuous supporting stringers.

Another object of the present invention is to provide a plurality of individual stair tread supporting units which can conveniently be assembled to form a stairway of any desired width or height.

Another object of the present invention is to provide a plurality of individual stair tread supporting units which can be assembled to form a spiral stairway.

A further and important object of the present invention is to provide a plurality of individual stair tread supporting units which may be produced economically and handled with a minimum of difficulty due to their small overall dimensions and bulk.

Other objects and advantages of the present invention will be apparent upon reading the following detailed description in conjunction with the accompanying drawings wherein like reference characters designate like parts throughout, and wherein:

FIG. 1 is a top plan view of a stairway embodying the invention;

FIG. 2 is an elevational view of the stairway of FIG. 1;

FIG. 3 is a top plan view of a bottom stair tread supporting unit secured to the bottom landing;

FIG. 4 is a sectional view of line 4—4 of FIG. 3;

FIG. 5 is a top plan view of a top stair tread supporting unit secured to the top landing;

FIG. 6 is a sectional view taken on line 6—6 of FIG. 5;

FIG. 7 is a fragmentary elevational view of the stairway with portions of the individual stair tread supporting units broken away;

FIG. 8 is an inside elevational view of an intermediate stair tread supporting unit of the outer tread supporting column;

FIG. 9 is a top plan view of the unit shown in FIG. 8;

FIG. 10 is a front end elevational view of the unit shown in FIG. 8;

FIG. 11 is a rear end elevational view of the unit shown in FIG. 8;

FIG. 12 is a bottom plan view of the unit shown in FIG. 8;

FIG. 13 is an outside elevational view of the unit shown in FIG. 8;

FIG. 14 is a sectional view on line 14—14 of FIG. 8;

FIG. 15 is an inside elevational view of an intermediate stair tread supporting unit of the inner tread supporting column;

FIG. 16 is a top plan view of the unit shown in FIG. 15;

FIG. 17 is a rear end elevational view of the unit shown in FIG. 15;

FIG. 18 is a front end elevational view of the unit shown in FIG. 15;

FIG. 19 is an outside elevational view of the unit shown in FIG. 15; and

FIG. 20 is a sectional elevational view of the mating elements and flange portions of two adjacent stair tread supporting units secured together and to a stair tread with a three-way joint.

Referring in more particularity to the drawings, a flying spiral stairway 10 spans between a lower landing or support surface 12 and an upper landing or support surface 14, such as the floors of a building. The stairway includes an outer curved stair tread supporting column 16 and an inner curved stair tread supporting column 18, each column comprising a plurality of individual curved stair tread supporting units. Stair treads 20 are supported on the columns 16 and 18 for pedestrian ascendency.

The tread supporting units comprising the inner column are shorter in the horizontal dimension than the units comprising the outer column, and the radius of curvature of the inner column is substantially less than the radius of curvature of the outer column. As shown in FIGURE 1, these differences in configuration provide a pair of spaced tread supports for a spiral stairway, "spiral" being used in the general sense to include a helix where the radius of curvature remains constant throughout the height of the stairway. The units are preferably constructed of metal and manufactured by a casting operation, however, equivalent materials such as fiberglass and the like, and other known methods of construction, may be utilized as will be apparent to those skilled in the art.

The individual curved stair tread supporting units of the outer column 16 include an outer bottom unit 22, an outer top unit 24, and a series of outer intermediate units 26. Each outer intermediate unit 26, as best seen in FIGS. 8–13, includes an upper mating element having a horizontally extending ridge 28 and an adjacent horizontally extending undercut 30, and a lower mating element having a horizontally extending ridge 32 and an undercut 34. The upper undercut 30 of one unit cooperates with the lower ridge 32 of the unit directly above in the series to secure these adjacent units in assembled relationship. Likewise, the lower undercut 34 of one unit cooperates with the upper ridge 28 of the unit directly below in the series to secure these adjacent units in assembled relationship. The cooperation between the mating ridges and undercuts provides three horizontal abutment surfaces 37, as best seen in FIG. 20, to insure rigidity against vertical flexing at the joints, as well as two vertical abutment surfaces 39 to insure rigidity against lateral flexing.

Each outer intermediate unit 26 also includes an inwardly directed upper flange 36 and a lower flange 38, each of which cooperate to support the stair treads 20. When the outer intermediate units are serially assembled, the upper flange 36 of each unit cooperates with the lower flange 38 of the unit directly above in the series to define a groove 40 within which the end portion of a stair tread 20 is received. The stair treads are securely fastened in the grooves 40 between the flanges by means of suitable fasteners 42. This three-way joint retains the mating elements of adjacent units in proper horizontal front to back relationship while at the same time securing the outer column in proper horizontal side to side position.

Each outer intermediate unit 26 further includes a cover plate or web portion 44 and a riser support 46 to which risers 48 may be secured. The risers themselves have been omitted from all but one location in FIG. 7 for purposes of clarity. The cover plate encloses the outside of the unit and functions as a strengthening means to increase the stability of the unit.

The outer bottom unit 22 of the outer column 16 includes, as best seen in FIGS. 3 and 4, an engaging plate 50 which cooperates with and is secured by suitable fasteners 51 to the lower landing or support surface 12. A mating element having a ridge 52 and an adjacent undercut 54 is provided at the upper end of the unit 22, and is adapted to cooperate with the lower mating element including the ridge 32 and undercut 34 of the outer intermediate unit 26 directly above to secure the bottom unit 22 thereto. An inwardly directed flange 56 at the upper end of the bottom unit provides a support for the first stair tread 20 of the stairway. The stair tread is securely fastened to the flange portion 56 by means of fasteners 42, which also retain the mating abutment elements of the bottom unit and the intermediate unit directly above in assembled relationship with a three-way joint. The outer bottom unit 22 also includes a riser support 58 and a web or cover plate 60, both of which function in the same manner as the riser supports 46 and plates 44 of the outer intermediate units 26.

The outer top tread supporting unit 24 includes, as best seen in FIGS. 5 and 6, an engaging plate 62 which cooperates with and is secured to the upper landing or support surface 14. A mating element having a ridge 64 and an adjacent undercut section 66 is provided at the lower end of the outer top unit 24, and is adapted to cooperate with the upper mating element including the ridge 28 and the undercut 30 of the intermediate unit 22 directly below to secure the top unit thereto. Unlike the outer bottom unit 22, the outer top unit 24 is provided with an inwardly directed upper flange 68 and a lower flange 70. The upper flange 68 supports the uppermost stair tread 20 while the lower flange 70 cooperates to support the stair tread directly therebelow. Suitable fasteners 42 are provided to securely fasten the stair treads to the above mentioned flanges. The fasteners also retain the mating elements of the outer top unit and the intermediate unit directly below in assembled relationship with a three-way joint. The outer top unit further includes a riser support 72 and a web or cover plate 74 which function is the same manner as the riser supports and cover plates of the other units.

The individual curved stair tread supporting units of the inner column likewise include an inner bottom unit 76, an inner top unit 78, and a series of inner intermediate units 80, all of which are generally similar to the outer column units described above.

Each inner intermediate unit 80 includes an upper mating element ridge 82 and associated undercut 84, and a lower mating element ridge 86 and undercut 88.

The upper and lower mating elements cooperate to secure adjacent units in abutting and assembled relationship. Each inner intermediate unit also includes an inwardly directed upper flange 90 and a lower flange 92 upon which the inner ends of the stair treads 20 are supported. When the inner intermediate units are serially assembled, the upper flange portion 90 of each unit cooperates with the lower flange 92 of the unit directly above in the series to define a groove similar to the grooves 40 in which the end portion of a stair tread 20 is received. The stair tread is securely fastened to each of the above mentioned flanges by means of fasteners 42 which also retain the mating elements of adjacent units in assembled relationship with a three-way joint.

Each inner intermediate unit 80 further includes a web or cover plate 94 and a riser support 96 to which the inner ends of the risers 48 may be secured. The cover plate encloses the outside of the unit and functions as a strengthening means to increase the stability of the unit.

The inner bottom unit 76 and the inner top unit 78 are substantially mirror image duplicates of the outer bottom and top units, respectively, differing only in horizontal length and curvature, as explained above, thus a detailed description of these units is unnecessary.

In use, the individual units are assembled at the building site. The ridge and undercut elements of adjacent units are slid horizontally into mating engagement to provide an abutment juncture of maximum strength against both vertical and lateral flexure. When so assembled, the flanges of two adjacent units provide a groove 40 within which one end of a tread is received. Suitable fastening means secure the tread between the flanges and also secure the units in their interlocked, abutting relationship. The treads hold the pair of curving columns in properly spaced relationship and add further rigidity to the structure.

As described, the stairway of the present invention is preferably of spiral configuration, although other shapes both linear and otherwise are included within the scope of the invention. Similarly, many variations of the disclosed mating elements are possible without sacrificing the highly desirable abutment relationship between adjacent units. Finally, the actual shape of the units is capable of many variations to suit individual artistic and design concepts.

The above described preferred embodiment is thus capable of considerable modification and variation within the spirit of the invention as defined by the following claims.

What is claimed is:

1. A stairway comprising an assembled series of individual stair tread supporting units, each unit having a laterally directed tread supporting flange at the upper end thereof with an upwardly extending portion connected thereto, a laterally directed tread engaging surface at the lower end thereof spaced from and directly above the tread supporting flange of the unit next therebelow in the assembled series, and a downwardly extending portion connected to the laterally directed tread engaging surface in overlapping abutting relationship with the upwardly extending portion of the unit next therebelow in the assembled series, and a plurality of stair treads with at least one of the treads positioned between each tread supporting flange and tread engaging surface in the assembled series.

2. A stairway as in claim 1 including securing means at the upper and lower ends of each unit for securing the units together in assembled relationship.

3. A stairway as in claim 1 wherein the upper and lower ends of each unit are out of vertical alignment with each other whereby the assembled series of units support the stair treads in spaced relationship in ascending, spiral array.

4. A stairway as in claim 1 wherein the assembled series of units form a pair of spaced tread supporting columns between which the stair treads are supported.

5. A stairway as in claim 4 wherein the units are curved to form inner and outer concentrically curved tread supporting columns.

6. A stairway as in claim 1 wherein each unit includes riser supporting means.

References Cited
UNITED STATES PATENTS

| 302,339 | 7/1884 | Jackson | 52—182 |
| 367,296 | 7/1887 | Heidland | 52—183 |
| 699,993 | 5/1902 | Weber | 52—182 |
| 2,593,683 | 4/1952 | Lyons. | |

HENRY C. SUTHERLAND, Primary Examiner